United States Patent
Zweckinger et al.

(10) Patent No.: US 11,092,432 B2
(45) Date of Patent: Aug. 17, 2021

(54) REFERENCE PLATE AND METHOD FOR CALIBRATING AND/OR CHECKING A DEFLECTOMETRY SENSOR SYSTEM

(71) Applicant: MICRO-EPSILON MESSTECHNIK GMBH & CO. KG, Ortenburg (DE)

(72) Inventors: Stephan Zweckinger, Fürstenstein (DE); Josef Hochleitner, Tiefenbach (DE); Hannes Loferer, Ortenburg (DE); Robert Wagner, Neuburg am Inn (DE); Rainer Hesse, Ortenburg (DE)

(73) Assignee: MICRO-EPSILON MESSTECHNIK GMBH & CO. KG, Ortenburg (DE)

( * ) Notice: Subject to any disclaimer, the term of this patent is extended or adjusted under 35 U.S.C. 154(b) by 156 days.

(21) Appl. No.: 16/344,316

(22) PCT Filed: Oct. 5, 2017

(86) PCT No.: PCT/DE2017/200106
§ 371 (c)(1),
(2) Date: Apr. 23, 2019

(87) PCT Pub. No.: WO2018/077356
PCT Pub. Date: May 3, 2018

(65) Prior Publication Data
US 2019/0265026 A1    Aug. 29, 2019

(30) Foreign Application Priority Data
Oct. 24, 2016   (DE) .......................... 102016220888.8

(51) Int. Cl.
*G06K 9/46*   (2006.01)
*G01B 11/25*   (2006.01)
(Continued)

(52) U.S. Cl.
CPC .......... *G01B 11/2504* (2013.01); *G01B 11/25* (2013.01); *G01M 11/0264* (2013.01);
(Continued)

(58) Field of Classification Search
CPC ....... G01N 21/8806; G01N 2021/8829; G01N 21/9515; G01N 21/93; G01N 2021/9518;
(Continued)

(56) References Cited

U.S. PATENT DOCUMENTS

2009/0231574 A1* 9/2009 Vogel .................. G01D 5/3473
356/154
2010/0141776 A1  6/2010 Ban et al.
(Continued)

FOREIGN PATENT DOCUMENTS

DE           19536297 A1      4/1997
DE      102011085322 A1      5/2013
(Continued)

OTHER PUBLICATIONS

Knauer et al. | "Phase Measuring Deflectometry: a new approach to measure specular free-form surfaces", Proc. SPIE 5457, Optical Metrology in Production Engineering, (Sep. 10, 2004).
(Continued)

*Primary Examiner* — Charlotte M Baker
(74) *Attorney, Agent, or Firm* — Jason P. Mueller; FisherBroyles, LLP

(57) ABSTRACT

The disclosure relates to a reference plate for calibrating and/or checking a deflectometry sensor system, said deflectometry sensor system including an image generation device and a capturing device having at least one capturing element, wherein the reference plate includes a reflective surface, and wherein, for the purpose of checking at least one system parameter of said deflectometry sensor system, the reflective surface is provided with a predefined pattern including
(Continued)

Figure 1:
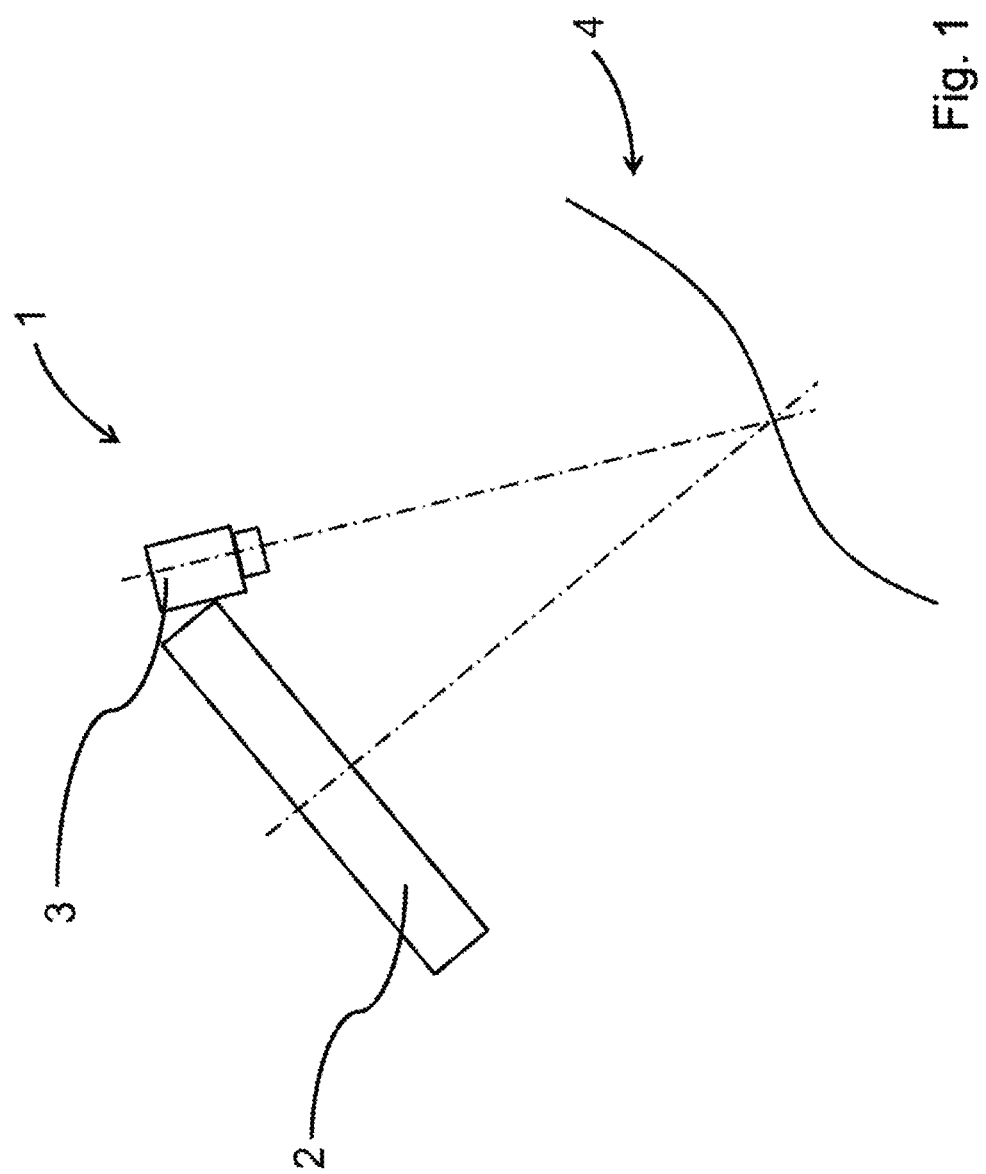

markings. A corresponding method for calibrating and/or checking a deflectometry sensor system is moreover indicated.

21 Claims, 12 Drawing Sheets

(51) Int. Cl.
*G01M 11/02* (2006.01)
*G01N 21/88* (2006.01)
*G01N 21/93* (2006.01)
*G01N 21/95* (2006.01)

(52) U.S. Cl.
CPC ......... *G01N 21/8806* (2013.01); *G01N 21/93* (2013.01); *G01N 21/9515* (2013.01); *G01N 2021/8829* (2013.01); *G01N 2021/9518* (2013.01)

(58) Field of Classification Search
CPC ..... G01B 11/25; G01B 11/24; G01B 11/2504; G06T 7/0004; G01M 11/0264
USPC ....... 382/190, 141; 356/445, 35.5, 496, 511, 356/512, 237.5, 521, 124, 127, 154, 432; 250/372; 430/201; 348/187, E17.002, 348/92, 93
See application file for complete search history.

(56) References Cited

U.S. PATENT DOCUMENTS

| | | | |
|---|---|---|---|
| 2011/0007326 A1 | 1/2011 | Daxauer et al. | |
| 2016/0025591 A1* | 1/2016 | Risner | F24S 40/90 348/93 |

FOREIGN PATENT DOCUMENTS

| | | |
|---|---|---|
| DE | 102012208514 A1 | 11/2013 |
| EP | 1003013 A1 | 5/2000 |
| JP | H10735644 A | 2/1995 |
| WO | 2015/169730 A1 | 11/2015 |

OTHER PUBLICATIONS

Breitbarth et al. | "Calibration of a combined system with phase measuring deflectometry and fringe projection", Proc. SPIE 7389, Opti-cal Measurement Systems for Industrial Inspection VI,738909 (Jun. 17, 2009).

* cited by examiner

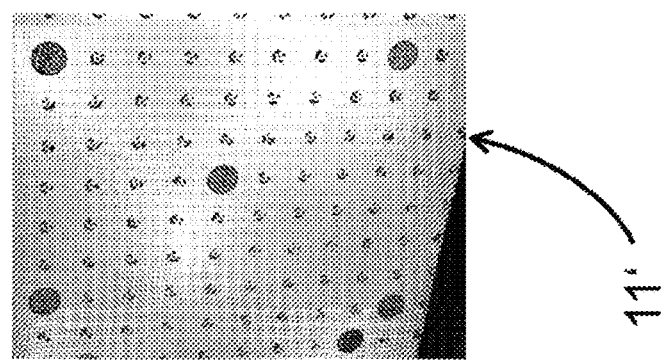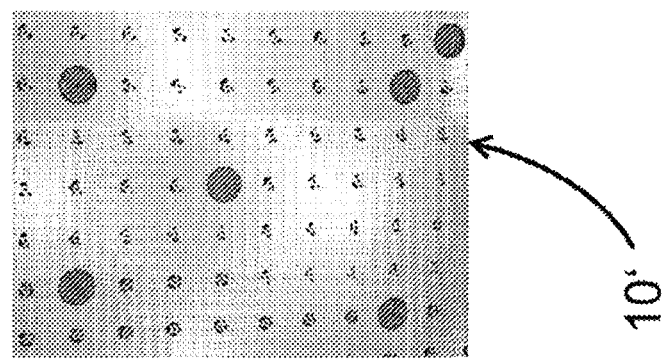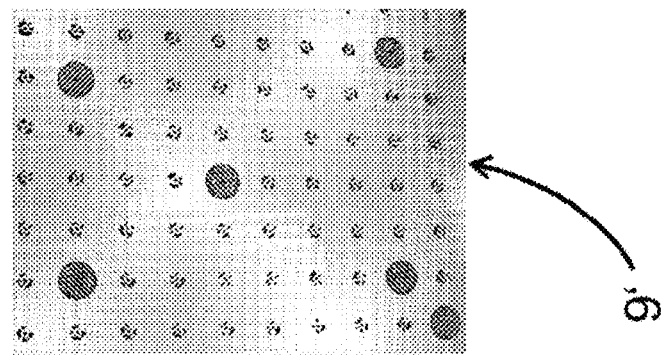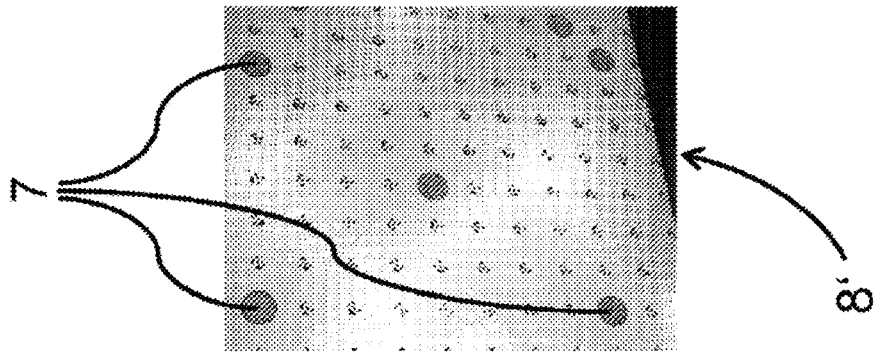
Fig. 4

REFERENCE PLATE AND METHOD FOR CALIBRATING AND/OR CHECKING A DEFLECTOMETRY SENSOR SYSTEM

CROSS-REFERENCE TO RELATED APPLICATIONS

This application is a national stage entry under 35 U.S.C. 371 of PCT Patent Application No. PCT/DE2017/200106, filed Oct. 5, 2017, which claims priority to German Patent Application No. DE 10 2016 220 888.8, filed Oct. 24, 2016, the entire contents of each of which are incorporated herein by reference.

This disclosure relates to a reference plate for calibrating and/or checking a deflectometry sensor system. The disclosure further relates to a method for calibrating and/or checking a deflectometry sensor system.

Disclosed systems provide improvements over conventional deflectometry systems. As an example only, reference is made to document DE 10 2011 085 322 A1 which discloses a method and a device for inspecting a surface structure of a reflective coating by deflectometry.

The measurement principle of deflectometry is particularly suitable for the geometric measuring of shiny or reflective surfaces. Here, a defined image pattern is recorded via the reflection on the surface of the measurement object which is to be measured by means of a camera. The distortions of the image pattern by the surface can be evaluated by means of appropriate algorithms, and therefrom the geometric properties of the surface can be reconstructed. Commonly, the image pattern, for example, a grayscale sinusoidal pattern, is generated by means of a screen. The shape of the sinusoidal pattern is known. In case of reflection of the image pattern via the measurement object, the image pattern is distorted. Based on the distortion, the geometry of the surface can then be computed and/or defects on the surface can be detected.

In many production sectors, increasingly stringent requirements are placed on the quality and the appearance of the surface of a component. For example, in the case of reflective surface, a flawless production is expected. Conventionally, the parts are checked manually, which leads to failure to detect defects, for example, due to fatigue of the personnel performing the testing personnel. Therefore, by means of robot-assisted deflectometry sensor systems, an automatic surface inspection of components requiring multiple measurement positions due to their dimensions can occur.

For this purpose, the deflectometry sensor can represent a stripe pattern as image pattern on its screen, which is reflected via the surface of the measurement object into the cameras of the deflectometry sensor. Defects on the surface cause deviations in the stripe pattern, which can be evaluated using software. A deflectometry sensor—consisting of a screen for stripe representation (or other image pattern representations) and one or more cameras—is led by a robot over the measurement object. Thereby, objects whose geometry requires multiple measurement positions can be inspected. The robot program is established based on a 3D model (CAD) of the measurement object. The sensor is led by the robot over the relevant surfaces and inspects the surface. The defects determined are evaluated and can be displayed in a 3D model.

However, in measurement systems mounted on robots or on robot arms, the calibration can be particularly laborious and complicated. The robot axes themselves can be calibrated using methods known from practice, so that a clear reference system for the tool center point (TCP) is defined. If a measurement system is moved by the robot or by the robot arm, then the precise position of the measurement system is thus also known. To the extent that the measurement system itself is calibrated, an exact geometric measurement of the measurement object is possible.

However, in a deflectometry sensor system, it is problematic that the exact position of the camera—as capturing element of a capturing device—and of the image pattern to be reflected by the measurement object (and thus the screen as image generation device) relative to one another under the secondary condition of the mirror reflection by the measurement object has to be known. Moreover, the deflectometry sensor of a deflectometry sensor system can also include multiple cameras, whereby a multiplicity of relative positions with respect to one another (each camera relative to the screen, and the cameras relative to one another) must be determined.

Image-processing measurement principles usually require a calibration of the measurement device. Methods for calibrating a camera or a system configuration are known from practice. For example, a reference target can be used for this purpose. The reference target can include a defined pattern with known geometric properties, so that the camera can be calibrated based on the reference target. A reference target known from practice for image processing consists of a flat plate on which a defined pattern is printed. However, this reference target can only be used limitedly for a deflectometry sensor system, since only the camera can be calibrated thereby. A calibration of the entire measurement arrangement or measurement configuration is not possible.

Therefore, the underlying aim of the disclosure is to design and develop a reference plate and a method for calibrating and/or checking a deflectometry sensor system of the type mentioned at the start, in such a way that, by structurally simple means, a simple and as timesaving as possible checking and/or calibration of the deflectometry sensor system is implemented.

According to the disclosure, the above aim is achieved by various embodiments. In an example embodiment, a reference plate for calibrating and/or checking a deflectometry sensor system is indicated, wherein the deflectometry sensor system includes an image generation device and a capturing device having at least one capturing element, wherein the reference plate has a reflective surface, and wherein, for checking at least one system parameter of the deflectometry sensor system, the reflective surface is provided with a predefined pattern including markings.

With regard to the method according to the disclosure, the above aim is achieved by various embodiments. Accordingly, a method for calibrating and/or checking a deflectometry sensor system is indicated, wherein the deflectometry sensor system includes an image generation device and a capturing device having at least one capturing element, wherein a function check of the deflectometry sensor system is carried out by means of a reference plate, wherein the reference plate has a reflective surface which is provided with a predefined pattern including markings, wherein an image of the reference plate is recorded with the capturing element or with the capturing elements of the capturing device, and wherein, based on the recorded image or based on the recorded images, at least one system parameter of the deflectometry sensor system is determined and/or checked.

According to an embodiment, it has been recognized that, with a view to a simple and as timesaving as possible calibration of a deflectometry sensor system, it is most particularly advantageous if as many system parameters of the measurement system as possible can be checked and/or calibrated using as few calibration tools as possible. For this purpose, according to the disclosure, a reference plate is provided, which has a reflective surface and wherein, for the checking at least one system parameter of the deflectometry sensor system, the surface of the reference plate is provided with a predefined pattern. Here, the pattern includes markings which can be used for checking and determining multiple system parameters. Thus, by means of the reference plate, a function check of the deflectometry sensor system is carried out, wherein, with the capturing element or with the capturing elements of the capturing device, an image of the reference plate is recorded. Based on the recorded image or—in the case of multiple capturing elements—based on the respective recorded images, at least one system parameter of the deflectometry sensor system is determined and/or checked.

Consequently, using the reference plate according to the disclosure and a method according to the disclosure for calibrating and/or checking a deflectometry sensor system, a reference plate and a method are indicated, according to which, using structurally simple means, a simple and as timesaving as possible checking and/or calibration of the deflectometry sensor system is made possible.

Here, it should be noted that a deflectometry sensor system includes an image generation device and a capturing device. As image generation device it is possible to use, for example, a screen or monitor. The capturing device is used for the recording of an image reflected by a measurement object or an image pattern of the image generation device. The capturing device can include one or more capturing elements. Advantageously, a camera can be used as capturing element. A deflectometry sensor of a deflectometry sensor system can be formed, for example, from the image generation device and the capturing device and designed as one unit.

For example, the deflectometry sensor of the deflectometry sensor system can include multiple cameras as capturing elements, so that a larger viewing range can be measured. The cameras are arranged on the image generation device, for example, a screen. Here, it is conceivable that the cameras are arranged, for example, at the corners or edges, or just on one side of the image generation device. Then, it can be particularly advantageous if the reference plate is designed so that each camera of the capturing device of the deflectometry sensor "sees" a pattern adapted to the geometric arrangement. Since the cameras advantageously can be arranged in such a manner that a largest possible viewing range is obtained, the reference plate advantageously should correspond to the size of the viewing range. As a result of the arrangement of the cameras, the viewing range may be distorted in perspective on the reference plate. In this case, it is advantageous if the arrangement of markings of the predefined pattern largely compensates for this distortion, for example, in that the settable markings are arranged in perspective. Thus, the viewing range of a camera can also be checked and calibrated at the corners, for example.

In order to compensate for mounting and production tolerances, the position of the image generation device and/or of the capturing device in front of the reference plate can be corrected additionally during the startup of the deflectometry sensor system. To the extent that the image generation device together with the capturing device is designed as a deflectometry sensor, and that this deflectometry sensor is mounted on a robot, an additional correction can occur by a correction transformation in the robot. The correction transformation can be determined in such a manner that the actual 3D coordinates of markings, for example, coded marks, are in the best possible agreement with the theoretical 3D coordinates. By means of the corrected sensor check position of the robot, i.e., the position of the robot for carrying out the function check of the deflectometry sensor system, the deflectometry sensor is again ideally positioned relative to the reference plate. For example, it is ensured thereby that the position of the deflectometry sensor or of the image generation device and of the capturing device relative to the measurement object is identical for any sensor, installation and robot.

According to an embodiment, markings of the predefined pattern—at least in the top view onto the surface of the reference plate—can be arranged in the form of a regular grid. Thus, a particularly simple and reliable calibration and/or checking of the deflectometry sensor system is/are possible. Here, it is conceivable that the markings are arranged on the surface in accordance with the grid points of a structured grid. As structured grid, it is possible to use, for example, rectangular grids, regular grids and/or Cartesian grids. The Cartesian grid—with a square grid structure—represents the simplest case, wherein the distances between the markings are the same in each case. Viewed in the top view, a square surface is thus enclosed by the markings. It should be understood that, in the top view, the markings of the predefined pattern could be arranged in one plane or else in planes arranged in different planes. Advantageously, the arrangement of the markings of the predefined pattern or the structure of the predefined pattern is known. In the context of an additional advantageous design, the arrangement of the markings of the predefined pattern or the structure of the predefined pattern can be provided according to a predefined statistical distribution.

Furthermore, the markings can be in a non-planar arrangement on the reflective surface. Thus, it is conceivable that a non-planar design of the reference plate is implemented wherein the markings are arranged at different heights on the reference plate. Thereby, it is possible that, in addition to the determination of the external system parameters of the capturing device or of the capturing elements, such as, for example, the 3D position and 3D orientation of the capturing elements (3×rotation, 3×translation), a determination of the internal system parameters of the capturing device is also possible. Internal system parameters of the capturing device include, for example, optical distortions and/or scaling factors, etc.

Furthermore, the predefined pattern—including markings—on the reflective surface of the reference plate can be designed in such a manner that the predefined pattern includes one or more marking groups and that a marking group for the image recording is provided, taking into consideration the geometric arrangement of the deflectometry sensor system for each capturing element of the capturing device. A marking group here can be understood to mean a group of multiple markings. Advantageously, a marking group here can be adapted individually to the respective capturing element of the capturing device, wherein, for example, a perspective distortion due to the arrangement of the deflectometry sensor system must be taken into consideration.

In an embodiment, the markings can include color marks.

In an advantageous manner, the markings can include coded marks. Coded marks are, for example, marks with coded point number. For this purpose, a coded mark can bear a pattern which corresponds to a code representing a unique numbering. For example, point codings distributed over a line, a ring or an area and arranged around the measurement point proper can be used. Thereby, codes with several hundred different point numbers can be generated. The coded marks can advantageously be designed in such a manner that they are invariant with respect to position, rotation and size. Moreover, coded marks can be designed to be invariant with respect to perspective or affine distortion. Based on the coded marks, it is also possible to generate a correction transformation in a robot, which is determined in such a manner that the actual 3D coordinates of the coded marks are in the best possible agreement with the theoretically settable 3D coordinates. Consequently, by means of the computed correction transformation, the position of the robot on which a deflectometry sensor is mounted can be corrected in such a manner that the deflectometry sensor system is re-positioned ideally relative to the reference plate. Thus, it is ensured in particular that the position of the deflectometry sensor, i.e., including image generation device and capturing device, relative to the measurement object, is identical for any sensor, installation and robot. A use of coded marks has the particular advantage that not all the coded marks—code marks—present have to be visible in the camera image. It is sufficient to observe a subset of the coded marks, since, due to the coding, the markings can be associated uniquely with the individual point positions.

In an example, the markings can include Siemens stars. Thus, based on the Siemens stars, the sharpness, contrast and/or viewing ranges of the capturing device or of its capturing elements can be determined, detected and/or evaluated in an ingenious way. Siemens stars offer the advantage that, for example, the sharpness can be determined independently of the size of the Siemens star.

In an example, the markings can include predefined contour edges. Thus, in an ingenuous way, the sharpness of an image can be determined based on the slope of the predefined contour edges.

In an example, the markings can include a predefined test chart. As test chart, for example, a striped grid, a depth of field tester and/or a resolution test image (USAF, NBS) can be used.

In an example, the Siemens stars can be arranged in the predefined pattern or in the marking groups—including the predefined pattern—in such a manner that, in each corner area of an image recorded by a capturing element of the capturing device, a Siemens star is present. Thus, the entire image area of a capturing element can be used for the function check of the deflectometry sensor system.

In an example, the Siemens stars can be arranged in the predefined pattern or in the marking groups, included of the predefined pattern, in such a manner that a Siemens star is present in each case in the central area of an image recorded by a capturing element of the capturing device. Thereby, the entire image area can be covered, in particular the corners and the center. Thus, in an ingenuous way, a control of the sharpness, for example, from top right to bottom left can be carried out—despite perspective top view.

In an example, the reference plate for the function check can be arranged in such a manner that image points included by the image generation device are reproduced by reflection via the reference plate on the capturing device. In an example, the reference plate can be positioned at a predefined distance from the capturing device. Thus, the distance between capturing device and reference plate is known and can be used for the computation of system parameters. Consequently, the reference plate can be positioned at a predefined distance from the capturing device and with predefined inclination in relation to the capturing device, so that an exact and precise deflectometry measurement and a corresponding system parameter computation are possible.

In an example, the image generation device can be operated with homogeneous brightness. In a particularly example, in the process, a white image is generated on or with the image generation device. As image generation device, it is conceivable to use, for example, a screen, a monitor or a light source generating an image pattern. Thus, the predefined pattern—including markings—on the surface of the reference plate can be represented on a white background and be evaluated simply and optimally for checking and/or calibrating system parameters of the deflectometry sensor system.

In an example, on the image generation device, a pattern including markings and/or a predefined pattern sequence including markings can be generated. Thus—in addition to the use of markings on the reference plate—via the use of markings (patterns) and/or pattern sequences on the image generation device, the position of the image generation device can be checked and/or calibrated.

For example, based on deflectometric measurements with different bandwidths (beat frequency recordings), a correspondence between capturing element pixels and image generation device pixels can be established. I.e., for each pixel/image point of the camera, the associated position on the screen is known. These pixel positions, optionally converted into a metric unit, in addition to markings on the reference plates can be used for a camera calibration. Thus, intrinsic and/or extrinsic camera parameters with respect to the virtual screen position (rectilinear beam path) can be determined. With the aid of the markings on the reference plate, the real position of the reference plate can be determined, and thus, in the end, also the real position of the screen. If the geometric properties of the reference plate are moreover known, then even the deflectometric measurement results of the reference plate itself can be used for the purpose of a reference measurement for monitoring and/or calibrating the deflectometric unit. If the reference plate is a (nearly) perfect planar mirror, for example, then, under the secondary condition of planarity, it is possible to monitor and/or calibrate the relative positions of image generation device, or screen and capturing device or its capturing element based on the known positions of the markings.

In an example, the image recorded respectively with the capturing element or with the capturing elements can include a marking group including markings, wherein, based on the marking group recorded with the image, the at least one system parameter of the deflectometry sensor system is determined. Consequently, based on marking groups individually adapted to a capturing element, system parameters of the respective capturing element can be precisely evaluated and checked.

In an example, system parameters of the deflectometry sensor system can include at least one sharpness parameter, at least one viewing range parameter, at least one brightness parameter, at least one position parameter and/or at least one robot correction parameter. Thus, all the essential system parameters of a deflectometry sensor system are taken into consideration, whereby a precise functionality of the deflectometry sensor system is ensured.

In an example, for the determination of the sharpness parameter of a capturing element of the capturing device, sharpness values of Siemens stars of the predefined pattern can be detected and/or evaluated. To the extent that the capturing device has multiple capturing elements, the respective capturing element can take into consideration the Siemens stars located within the marking group associated with the respective capturing element. Thus, a relevant system parameter of a deflectometry sensor system can be taken into consideration.

In an example, for the determination of the viewing range parameter of a capturing element of the capturing device, positions of Siemens stars of the predefined pattern can be detected and/or evaluated. To the extent that the capturing device has multiple capturing elements, the respective capturing element can take into consideration the Siemens stars which are located within the marking group associated with the respective capturing element. Thus, a relevant system parameter of a deflectometry sensor system can be taken into consideration.

In an example, for the determination of the brightness parameter of a capturing element of the capturing device, a grayscale value determination can be carried out in a settable, central, image area of the image captured by the capturing element. Here, the image area is advantageously selected in such a manner that no markings of the predefined pattern are present in the image area. In other words, the brightness can be determined via the unprinted areas of the reflective surface, in that the image of the image generation device is observed in the mirror, i.e., in the reflective surface of the reference plate. Thus, a relevant system parameter of a deflectometry sensor system can be taken into consideration.

In an example, for the brightness correction of the deflectometry sensor system, a new brightness setting of the image generation device for reaching a target grayscale value of the capturing device can be calculated based on a grayscale value of the capturing device recorded with a predefined brightness setting of the image generation device. Accordingly, for the brightness correction of the deflectometry sensor system, a new brightness setting of the image generation device for a target grayscale value of the capturing device can be calculated based on the previous brightness setting, the resulting current grayscale value and an approximately known relationship between these values. Thus, it is then possible, by means of application software, to set the brightness of the image generation device during operation in an automated and regular manner, and thus to correct the brightness decrease of the image generation device. Since this can occur in the context of a daily function check, no additional time expenditure is necessary. Moreover, in an automated manner, a request for replacing the previous—old—image generation device can be output as soon as the image generation device has aged to such an extent that the maximum brightness setting is no longer sufficient to compensate for the brightness decrease. Thus, in an ingenuous way and in an automated manner during production, a constant measurement result can be achieved.

In an example, for the determination of the position parameter of a capturing element, positions of coded marks of the predefined pattern can be detected and/or evaluated. To the extent that the capturing device has multiple capturing elements, the respective capturing element can take into consideration the coded marks which are located within the marking group associated with the respective capturing element. Thus, a relevant system parameter of a deflectometry sensor system can be taken into consideration.

In an example, for the determination of the robot correction parameter, in particular for the determination of a 3D transformation as robot correction parameter, distances between target position and current position of the coded marks can be determined, wherein, by means of a minimization algorithm, the robot correction parameter or the 3D transformation is calculated. Thus, a relevant system parameter of a deflectometry sensor system can be taken into consideration. Concretely, for example via a previously performed camera calibration and via a current camera position check, it is possible that the following information can be available for detected coded marks of all the cameras:
target 3D coordinates of the coded marks according to CAD (computer-aided design)
current 3D coordinates of the coded marks according to camera position check.

The goal then is to position or to correct the deflectometry sensor in such a manner that these two 3D point quantities are in the best possible agreement. Accordingly, for each detected coded mark, the distance between target position and current position can be determined. In the sense of a minimization problem (for example, the sum of the squares of the distances between all the points of all the cameras should be at a minimum), a 3D transformation (3×rotation, 3×translation) can be calculated, which is used for the correction of the robot position in order to bring the currently measured 3D positions of the coded marks closer to the target positions.

Advantageous designs of the reference plate can be used for the online monitoring and online compensation of deflectometry sensors or deflectometry sensor systems. Using a single reference plate, multiple or a large number of system parameters of deflectometry sensor systems can be checked, monitored, compensated and/or calibrated.

Advantageous designs of the disclosure can ensure the functionality of a deflectometry sensor or of a deflectometry sensor system during production and to check its functionality over the course of its useful life. For this purpose, the position, sharpness and brightness of the cameras of the deflectometry sensor and of their viewing ranges can be set or checked and evaluated. If certain system parameters—excluding settable tolerances—are not in agreement with predetermined target values, then the functionality is no longer guaranteed, and the sensor must be either readjusted or exchanged.

The function check can occur, on the one hand, at the end of the production process, so that only deflectometry sensors of which the system parameters are within defined limits are delivered.

On the other hand, the system parameters of the deflectometry sensor should also remain within these limits during their useful life, whereby a regular function check of the parameters for position, sharpness, brightness and viewing ranges during running operation of the installation is necessary. Depending on the calculated results of the function check, corresponding messages can be output to operators or to the installation control system.

If one dispenses with checking the target properties of the deflectometry sensor at the end of the production process or during the use of the sensor, then sensors from different production sequences or as a result of changes such as, for example, aging, mechanical deformation, temperature change, etc., at first yield mutually differing measurement results in the course of their useful life. Based on this measurement data, evaluation parameters for algorithms then have to be continuously adapted in order to ensure uniform results, for example, for defect detection on reflective surfaces or for 3D geometry construction of the surface. Differences in the production moreover prevent, for example, a simple exchange of deflectometry sensors as replacement parts in associated checking installations without any adaptation of the subsequent evaluation parameters. Such a uniform parallel operation of multiple installations with multiple such sensors is also difficult to achieve.

Different possibilities then exist for designing and developing the teaching of this disclosure in an example. For this purpose reference is made, on the one hand, to the claims dependent on Claim 1 and Claim 10, and, on the other hand, to the following explanation of embodiment examples of the disclosure in reference to the drawing. In connection with the explanation of the embodiment examples of the disclosure in reference to the drawing, designs and developments of the teaching are also explained in general.

The figures in the drawing show

Figure 2:
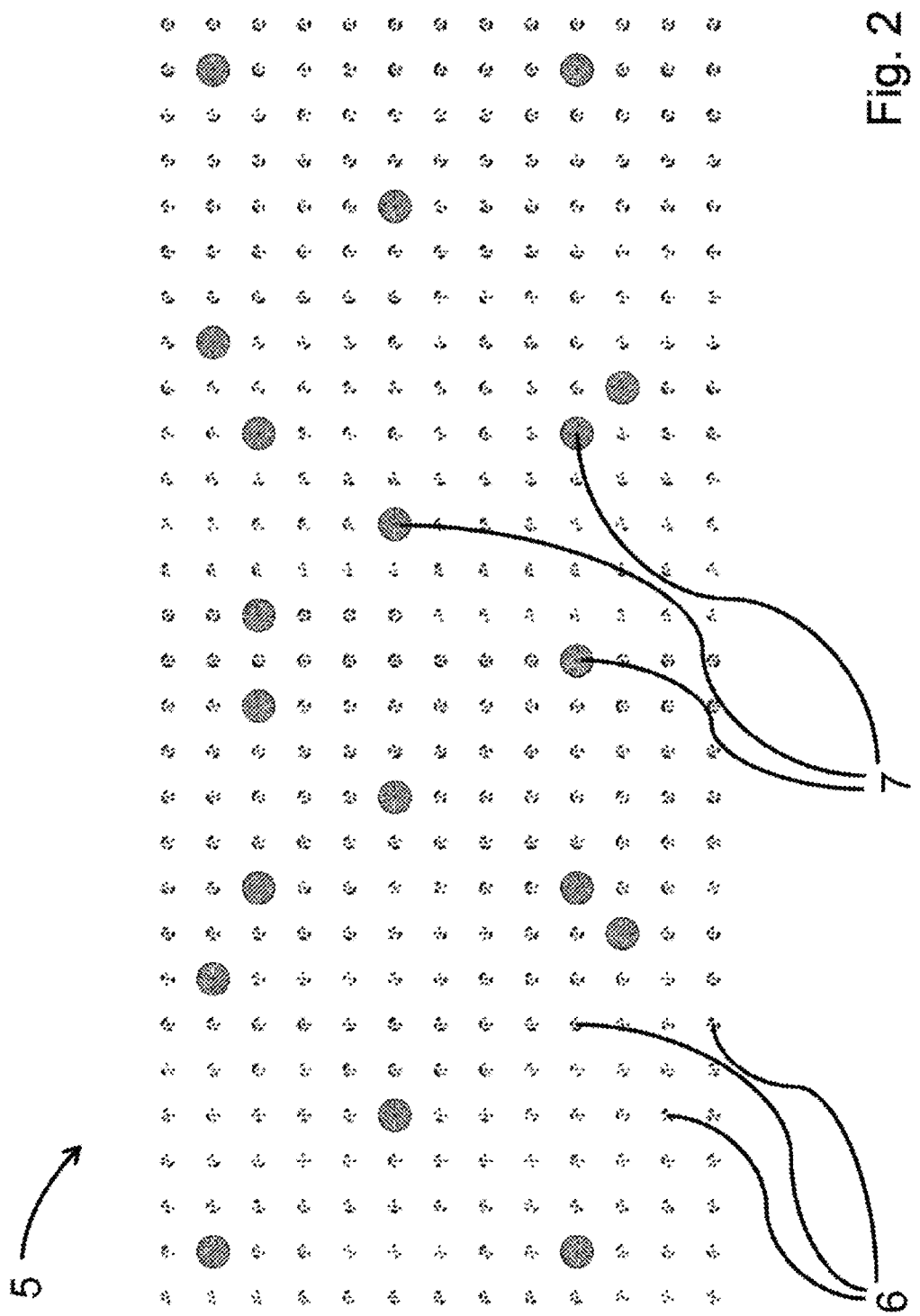
Figure 3:
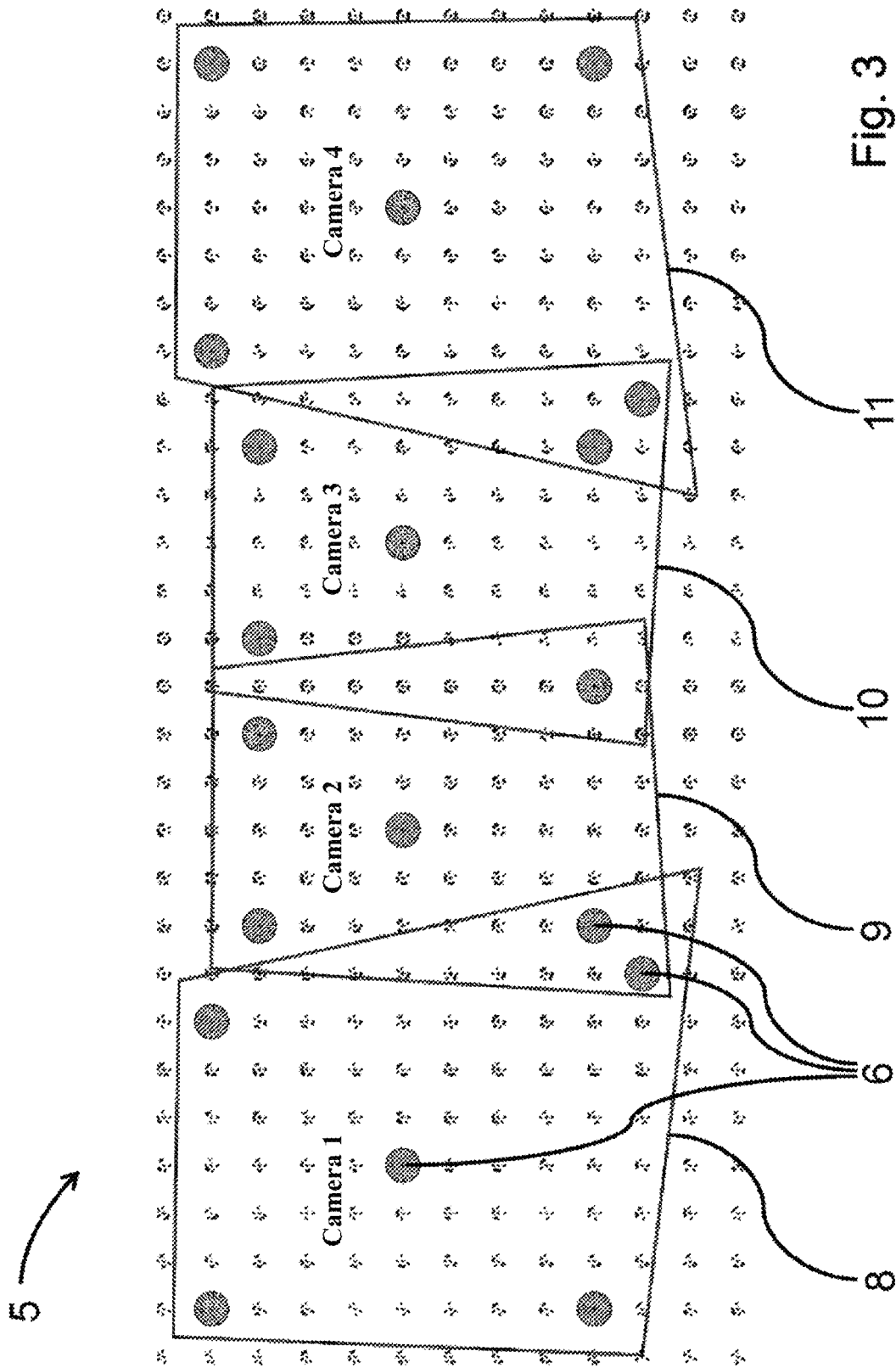
Figure 5:
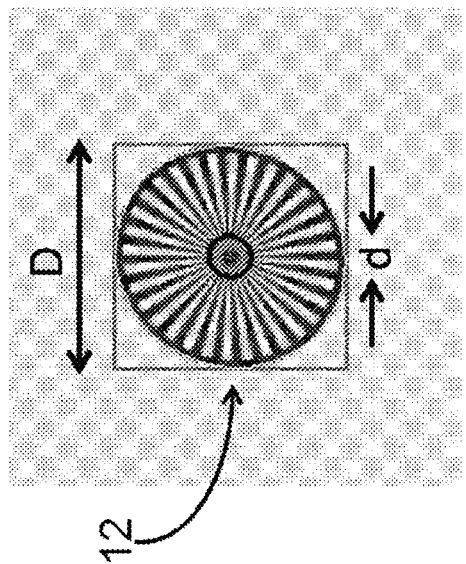
Figure 6:
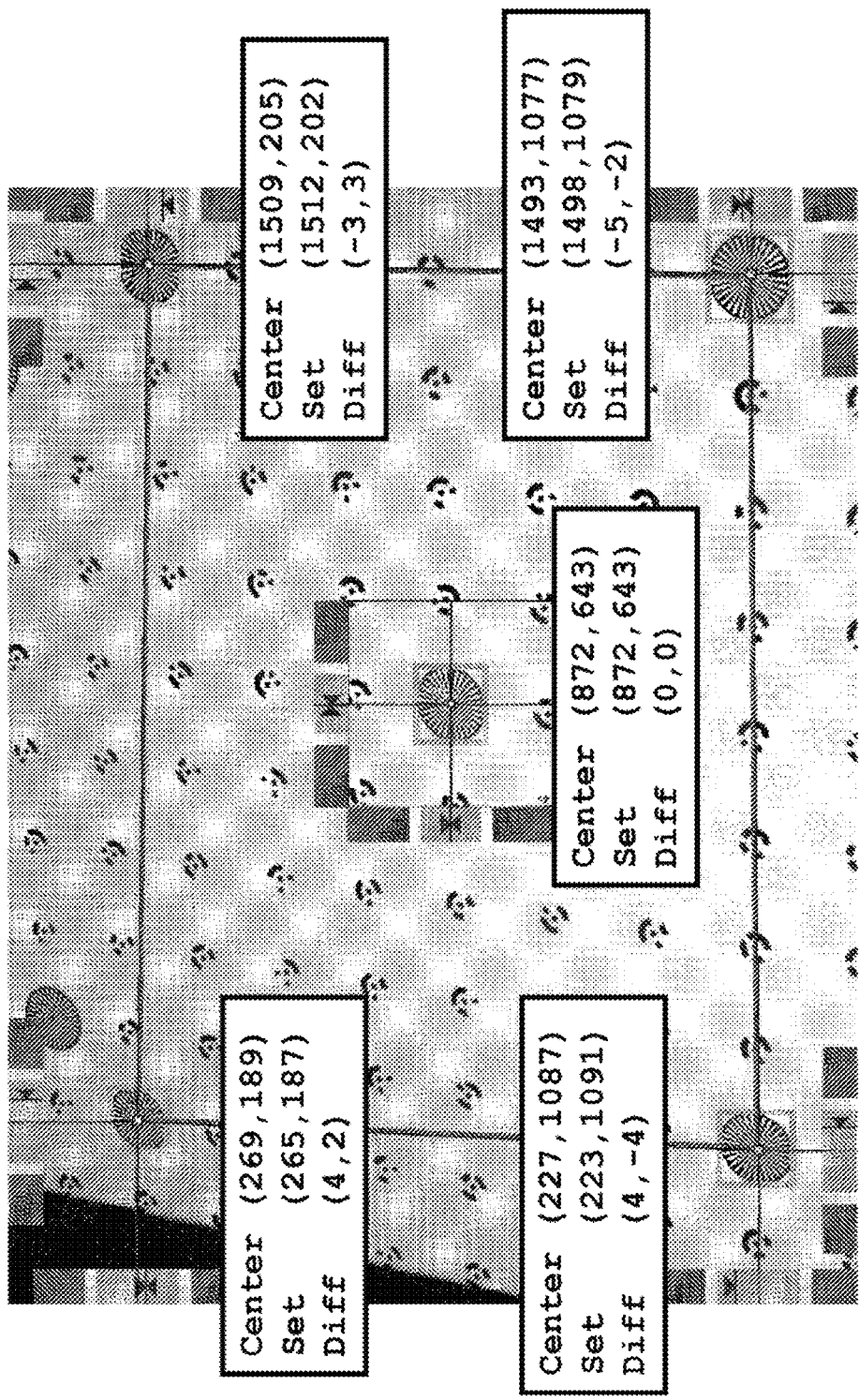
Figure 7:
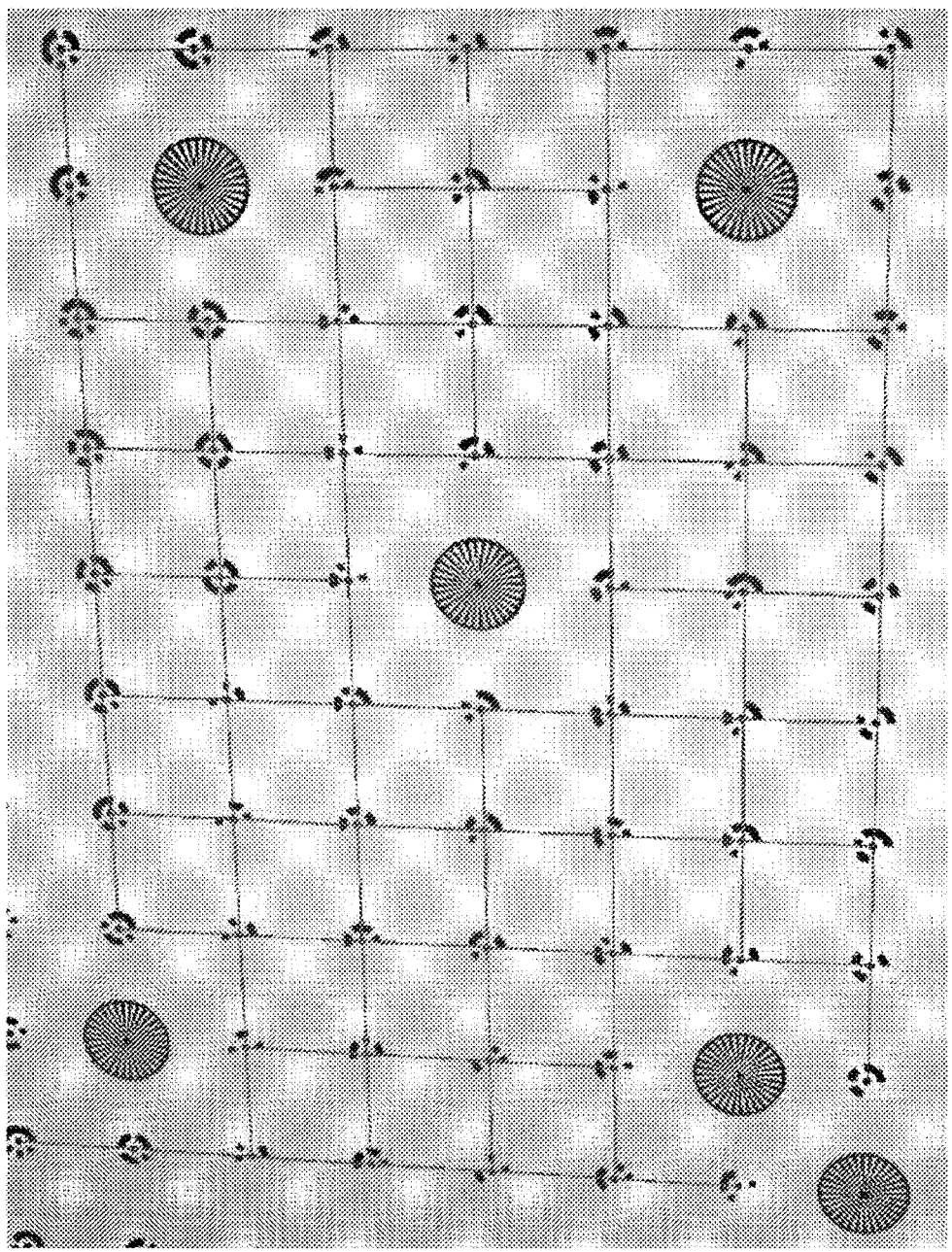
Figure 8:
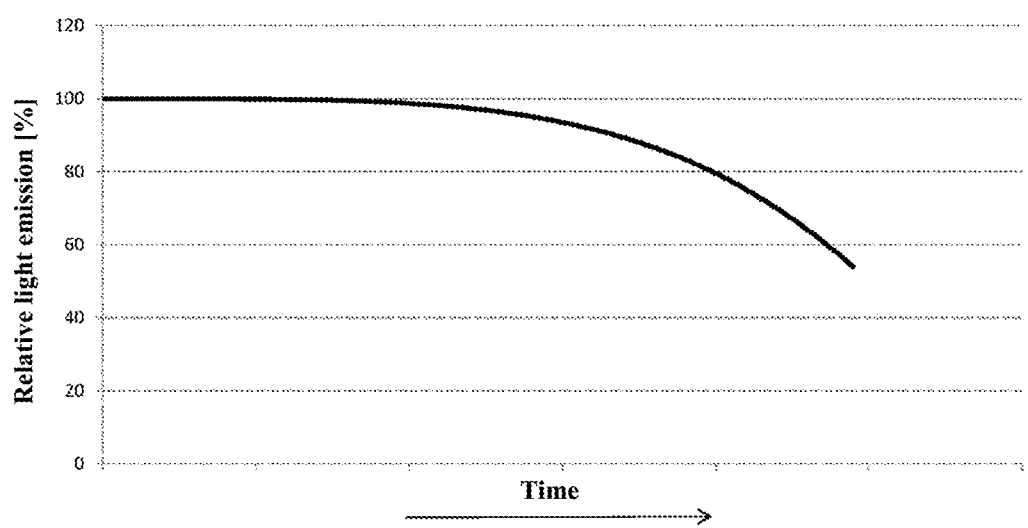
Figure 9:
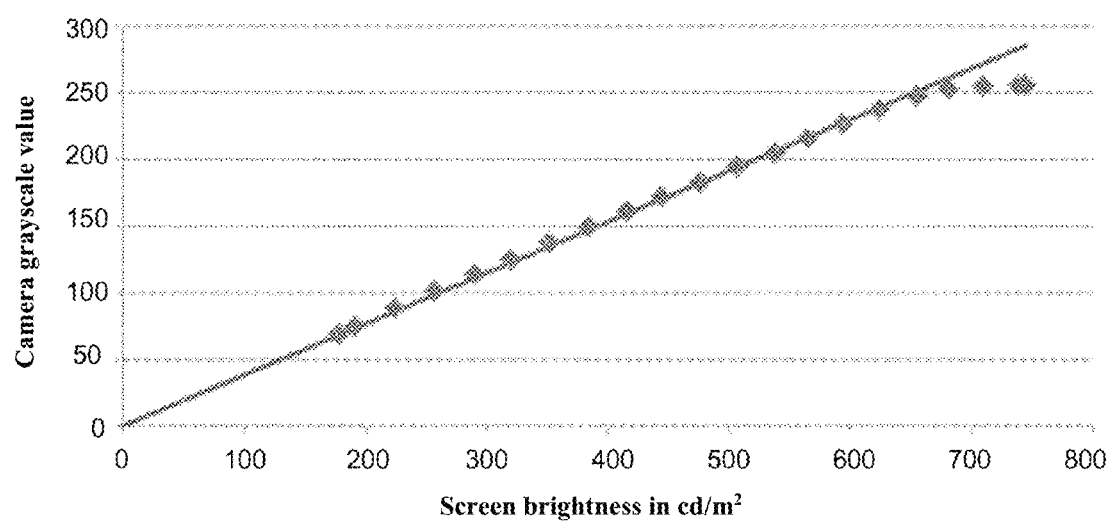
Figure 10:
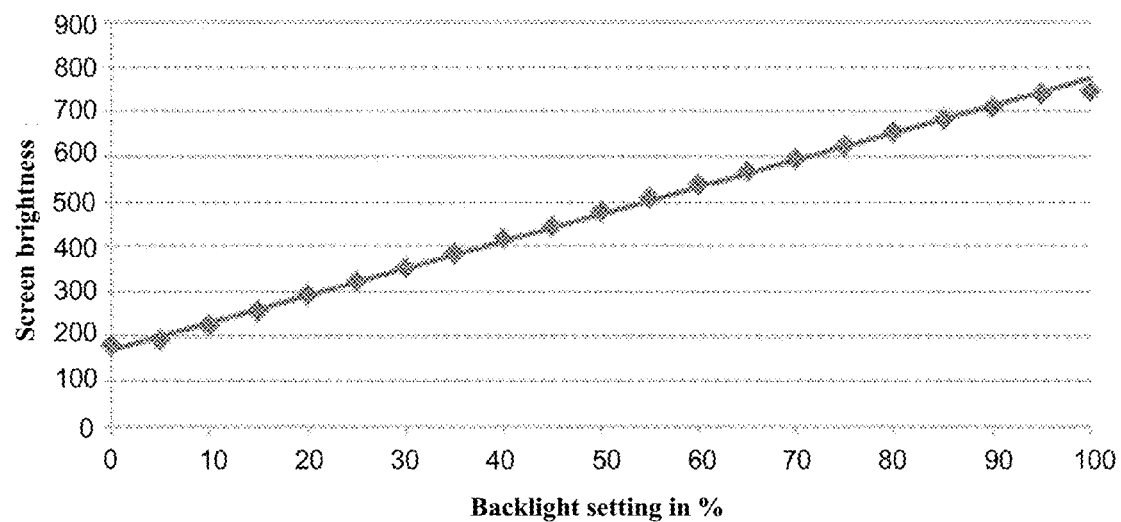
Figure 11:
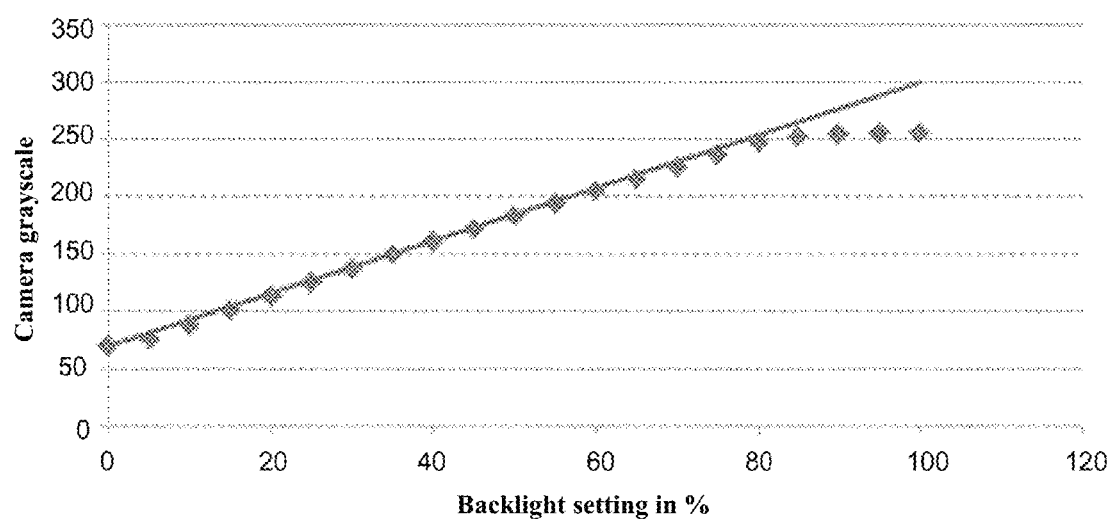
Figure 12:
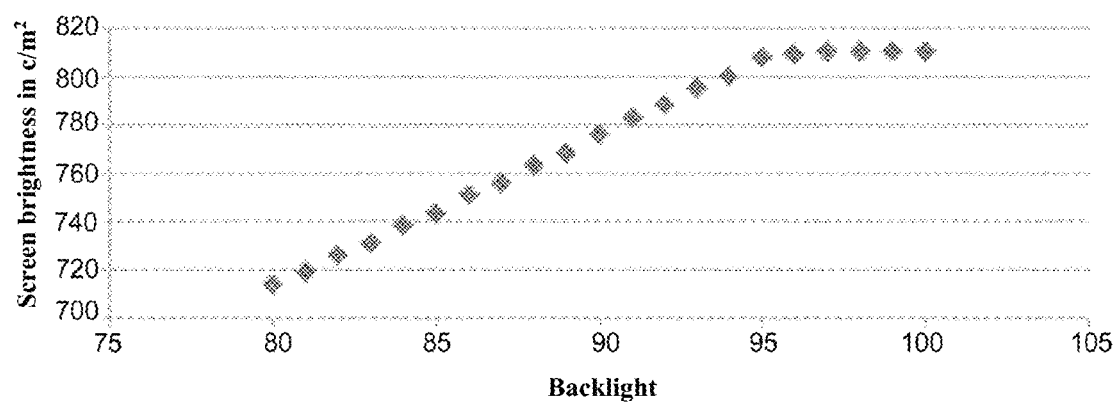

FIG. 1 in a diagrammatic view, an example of a configuration of a deflectometry sensor system for the use of an embodiment example of the reference plate according to the disclosure or the method according to an embodiment of the disclosure, FIG. 2 in a diagrammatic top view, an embodiment example of a reference plate according to an embodiment of the disclosure, FIG. 3 in a diagrammatic top view, the embodiment example according to FIG. 2, wherein multiple marking groups are represented on the exemplary reference plate, FIG. 4 in a diagrammatic view, four images of the reference plate according to FIG. 2 and according to FIG. 3, each image having been recorded with a camera of a deflectometry sensor system including four cameras, FIG. 5 an exemplary Siemens star for an embodiment example of a reference plate according to the disclosure and for the sharpness check according to an embodiment example of the method according to an embodiment of the disclosure, FIG. 6 in a diagrammatic view, an illustration of a viewing range check according to an embodiment example of the method according an embodiment of to the disclosure, FIG. 7 in a diagrammatic view, an illustration of a camera position check according to an embodiment example of the method according an embodiment of to the disclosure, FIG. 8 a diagram for illustrating the aging of a screen with regard to the relative light emission, FIG. 9 a diagram for illustrating the relationship between camera grayscale value and screen brightness of a deflectometry sensor, FIG. 10 a diagram for illustrating the relationship between screen brightness and backlight setting of the screen of a deflectometry sensor, FIG. 11 a diagram for illustrating the relationship between camera grayscale value and backlight setting of the screen of a deflectometry sensor, and FIG. 12 a diagram for illustrating the relationship between screen brightness and backlight setting in the interval [80; 100] of a deflectometry sensor.

FIG. 1 shows, in a diagrammatic view, an exemplary configuration of a deflectometry sensor system for the use of an embodiment example of the reference plate according to the disclosure or of the method according to the disclosure. The deflectometry sensor system according to FIG. 1 includes a deflectometry sensor 1. The deflectometry sensor 1 includes a screen 2 as image generation device for generating an image pattern. Moreover, the deflectometry sensor 1 includes a camera 3 as capturing element of a capturing device. The camera 3 records the mirror image of the image pattern reflected by the measurement object 4. The measurement object 4 has a shiny or reflective surface.

FIG. 2 shows, in a diagrammatic top view, an embodiment example of a reference plate according to the disclosure. The reference plate 5 represented in FIG. 2 has a predefined pattern including markings—on its surface. The predefined pattern consists of coded marks 6 arranged in the form of a regular grid. Instead of multiple coded marks, Siemens stars 7 are arranged as markings. The reference plate 5 shown in a top view is designed for the calibration of deflectometry sensor with four cameras.

FIG. 3 shows, in a diagrammatic top view, the embodiment example according to FIG. 2, wherein multiple marking groups are represented on the exemplary reference plate 5. FIG. 3 shows the grouping of the Siemens stars 7 in a marking group for each camera. In each case, four Siemens stars 7 are arranged so that they are located in the field of view of a camera. The first marking group 8 is for the first camera, the second marking group 9 for the second camera, the third marking group 10 for the third camera, and the fourth marking group 11 for the fourth camera. The Siemens stars 7 are here arranged so that a perspective distortion due to the image recording is taken into consideration.

FIG. 4 shows, in a diagrammatic view, four images of the reference plate 5 according to FIG. 2 and according to FIG. 3, which were recorded each with a camera of a deflectometry sensor system including four cameras. Concretely, FIG. 4 shows the images 8', 9', 10' and 11' of the respective camera. The image 8' reproduces the marking group 8 according to FIG. 3. The image 9' reproduces the marking group 9 according to FIG. 3. The image 10' represents the marking group 10 according to FIG. 3. The image 11' represents the marking group 11 according to FIG. 3. By the perspective arrangement of the Siemens stars 7 on the reference plate, the stars appear in each case at the corners in the camera image, so that the entire camera image of the cameras can be used for the calibration.

According to an embodiment example of the disclosure, a check of the functionality of a deflectometry sensor system is carried out by means of a reference plate as reference target, especially developed for this purpose. Here, the deflectometry sensor—including a screen as image generation device and a capturing device with one or more cameras as capturing elements—is positioned in front of the reference plate at a defined distance, and, for each camera, an image is recorded, which is then evaluated and rated. The arrangement corresponds to the deflectometry condition, i.e., the reference plate is positioned so that the pixels/image points of the screen are represented in a mirroring arrangement—angle of incidence equal to angle of reflection—on the camera.

The reference plate includes a surface mirror which is provided with a predefined pattern having markings at different positions. The predefined pattern is used for checking different system parameter values. The predefined pattern on the reference plate can consist, for example, of a combination of coded marks and Siemens stars.

According to an embodiment example, the coded marks are used for determining the 3D position of the cameras (3×rotation, 3×translation). The Siemens stars are used for determining the sharpness, the contrast and the viewing ranges, wherein the Siemens stars are arranged so that for each camera a star is present in the center and in the four corners of the image recorded by a camera.

The brightness can be determined via the unprinted area of the mirror, in that the image generated by the screen is viewed in the reflective surface of the reference plate.

For the calibration of the cameras of the capturing device of the deflectometry sensor, first the screen is operated with homogeneous brightness, for example, white. The predefined pattern on the reference plate is therefore represented on a white background and can be simply evaluated for calibrating the camera.

In the context of an embodiment example of the disclosure,—in addition to the use of markings on the reference plate—,the use of markings (patterns) or pattern sequences on the image generation device can be used for monitoring purposes and/or for calibrating the position of the image generation device is implemented.

As an example, based on deflectometric measurements with different bandwidths (beat frequency recordings), a correspondence between camera pixels and image pixels can be established. I.e., for each image point of the camera, the associated position on the screen is known. These pixel positions, converted into a metric unit, can be used in addition to markings on the reference plate for the camera calibration, and thus intrinsic and/or extrinsic camera parameters with regard to the virtual screen position (rectilinear beam path) can be determined. With the help of the markings on the reference plate, the real position of the reference plate can be determined, and thus in the end also the real position of the screen.

If, in addition, the geometric properties of the reference plate are known, the deflectometric measurement result of the reference plate can even be used for the purpose of a reference measurement for monitoring and calibrating the deflectometric unit. If the reference plate is, for example, a (nearly) perfect planar mirror, then, under the secondary condition of planarity, it is possible to monitor and/or calibrate the relative positions of screen and camera based on the known positions of the markings.

For the evaluation of the different test criteria, target values and tolerances within which the measurement values must lie are verified in order to be rated as "in order" or acceptable. If determined measurement values of the deflectometry sensor system fall outside of the predetermined tolerances, the deflectometry sensor system is qualified as "out of order" and can thus not be used further.

In a second step, on the screen, a defined image pattern can be generated, which is reflected via the reference plate and recorded by the capturing device or its cameras as capturing elements. Via the reflection of the image pattern represented by the screen, the relative position of screen and cameras with respect to one another can then be calibrated.

The advantage of this method lies in that with one image recording per camera all the system parameters to be checked can be determined, whereby a rapid and simple checking of the deflectometry sensor system, for example, in the production line is possible.

If one uses non-planar designs of the reference plate, i.e., an embodiment example of the reference plate which has, For example, markings—such as, for example, coded marks and/or Siemens stars—at different levels on the surface of the reference plate, or if one carries out the recordings described for the function check from multiple relative positions between deflectometry sensor and reference plate, then, in addition to the determination of external camera parameters, for example, 3D position and 3D orientation of the cameras (3×rotation, 3×translation), a determination of the internal camera parameters is also possible. Consequently, a complete calibration of the optical system and—in addition—of the whole deflectometry sensor system can be implemented.

As an example, a procedure sequence of the function check according to an embodiment example of the method according to the disclosure can be carried out as follows:

1. The deflectometry sensor (including a screen as image generation device and multiple cameras as capturing elements of the capturing device) and the reference plate are positioned at a predefined distance from one another and at a predefined inclination.

2. Representation of a white image on the screen of the deflectometry sensor.

3. Recordings of the reference plate are produced with all the cameras of the deflectometry sensor.

4. Check of the sharpness. If the sharpness value of the capturing device of the deflectometry sensor is outside of a settable operating range, the deflectometry sensor cannot be operated further.

5. Check of the viewing ranges. If the deviations of the viewing ranges of the capturing device of the deflectometry sensor are outside of a settable operating range, the deflectometry sensor cannot be operated further.

6. Check of the brightness. If the brightness of the screen of the deflectometry sensor is outside of a settable operating range, then the screen is recalibrated.

7. Check of the position of the cameras of the capturing device. If a camera position is outside of a settable operating range, the deflectometry sensor cannot be operated further.

8. Check of the robot correction. If the calculated correction leads to a better position of the sensor in front of the reference plate and if it is within a settable operating range, the robot on which the deflectometry sensor is mounted is newly corrected. If the correction is outside of a settable operating range, the deflectometry sensor cannot be operated further.

9. Output of warning signals if an exchange of the deflectometry sensor is imminent, or output of error signals if the deflectometry sensor cannot be operated further.

This procedure can be carried out in an example at regular time intervals such as, for example, once per day.

Below, the individual check steps according to an embodiment example of the method according to the disclosure and in reference to FIG. 5 to FIG. 12 are described:

Sharpness check:

For checking the sharpness of the deflectometry sensor, the sharpness values of all the Siemens stars of each camera are evaluated. In an example, this occurs automatically.

The Siemens stars—arranged as markings on the surface of the reference plate—are configured in such a manner that each Siemens star has a fixed number of segments. The sharper the image recorded by a camera is, the farther inward the individual segments can be seen. Thus, the ratio of the radius at which all the segments of the Siemens star can still be clearly recognized (from outside to inside) to the radius of the Siemens star can be a measure of the sharpness 1 minus. The value range of the sharpness can thus be from 0% (completely outside) to 100% (completely inside).

By converting the sharpness value in percent into a value which is independent of the size of the Siemens star, Siemens stars of different size can be used for evaluating the sharpness. This results in the following corresponding calculation:

$$\text{Lp/mm (Line pairs/millimeter)} = \frac{\text{Number of segments}}{Pi * \text{sharpness value [\%]} * \text{diameter}}$$

As an example, FIG. 5 shows a Siemens star 12 for an embodiment example of a reference plate according to the disclosure and for the sharpness check according to an embodiment example of the method according to the disclosure, wherein the no longer resolved, blurry area d is 18 percent of the total range D there.

For the evaluation of the total sharpness of a camera, i.e., a capturing element of the capturing device, the minimum of the sharpness values of all the "visible" Siemens stars of the camera can be used, for example.

"Visible" here is understood to mean Siemens stars which can be detected by means of the recorded image of the camera.

Viewing Range Check:

The checking of the viewing ranges can occur by monitoring the Siemens star positions. The target positions are predetermined, for example, by a CAD model.

FIG. 6 shows, in a diagrammatic view, an illustration of a viewing range check according to an embodiment example of the method according to the disclosure.

Camera Position Check:

For determination of the position of a camera, the coded marks arranged on the reference plate are used. In an example, they are detected automatically.

FIG. 7 shows, in a diagrammatic view, an illustration of a camera position check according to an embodiment example of the method according to the disclosure.

Since the real or actual coordinates of the coded marks—based on the unique numbering by the code—on the reference plate are known, it is possible to determine the current 3D position of the reference plate or of the camera with the help of the precalibrated camera. This can be used for monitoring or checking the camera position, since the reference plate and also the robot position are held stationary.

Robot Correction Check:

For the determination of a robot correction, in order to compensate for mounting and production tolerances, the detected coded marks of all the cameras of the capturing device of the deflectometry sensor can be used. For this purpose, all the coded marks are transferred into a common coordinate system with the help of the information from the camera calibration and a currently determined camera position.

The solution of a minimization problem which is to be computed, then yields a transformation which optimally reproduces all the coded marks in space in the ideal CAD position. This transformation is stored as correction in the robot, in order to optimally align the deflectometry sensor.

Brightness Check:

In order to obtain reproducible results in a deflectometric measurement, the brightness of the screen should be nearly constant. Due to the aging of a screen, the brightness decreases over time. This is represented in FIG. 8, for example. FIG. 8 shows a diagram for illustrating the aging of a screen with regard to the relative light emission, wherein the relative light emission in percent is plotted against time.

As the brightness oscillations increase over time, the parametrization effort and the occurrence of measurement errors also increase.

Therefore, the backlight of the screen of a deflectometry sensor is set so that the brightness in the center of the screen assumes a passable target value which does not correspond to the maximum brightness. At regular intervals, the brightness will be controlled and the brightness loss caused by aging will be compensated by an increase in the backlight brightness. For this purpose, in practice, an external measurement device as well as numerous manual steps are necessary.

For example, in the case of sensors in paint defect control, this is entails considerable effort during use in the production line. Thus, for example, the body inlet must be blocked, the measurement cell must be accessed, the deflectometry sensor on the robot must be moved into a maintenance position, a prolonged waiting time must be observed in order to compensate for storage-caused brightness oscillations, a brightness measurement device must be attached to the screen, a connection between screen and a laptop must be established, the brightness must be set by software taking into consideration the brightness measurement device, by means of a laptop to be connected or on menu keys on the screen, the measurement cell must be left again, the robot must be moved back into a home position, and the body inlet must be unblocked again.

For this sequence, at least 30 minutes per sensor are necessary. Since this is hardly feasible during ongoing production, weekend interventions are sometimes necessary for this purpose. Recalibrating the brightness is therefore possible only at longer time intervals.

This results in the requirement that the image brightness must be resettable in an automated manner at short intervals, without having to interrupt the production for this purpose.

In order to check the function capability of the deflectometry sensor system, for example, on daily basis, the above-described procedure sequence is carried out as "sensor check." In the context of the function check, for the brightness check, for each camera of the deflectometry sensor, in a rectangle in the center of the respective image, the average grayscale value in the unprinted areas of the mirror, i.e., of the reflective surface of the reference plate, is determined. This average grayscale value is referred to as "camera grayscale value" below.

The apertures of the camera lens are set during the sensor production in such a manner that, at the target brightness of the screen, a defined camera grayscale value is reached.

If the brightness of the screen decreases due to aging of the screen, then the images recorded by the cameras—in the context of the function check—become darker and the camera grayscale value decreases. If the backlight is set to be brighter, the screen brightness and the images recorded by the cameras become brighter, that is to say the camera grayscale value increases. Due to this relationship between camera grayscale value, backlight setting and screen brightness, it is possible to determine, based on the images recorded in the context of the function check, whether and to what extent the backlight must be readjusted in order to compensate for the aging-caused brightness decrease of the screen.

The following experimentally determined results refer, as an example, to a screen with screen controller known from practice, wherein the camera lenses are set so that a screen brightness of 600 $cd/m^2$ leads to a camera grayscale value of 230.

By means of the screen controller, the backlight of a screen can be regulated in 1% steps from 0% to 100%. The screen has a maximum brightness of 800 $cd/m^2$.

Between the camera grayscale value GW and the screen brightness DH, a linear relationship exists. This is represented in the diagram according to FIG. 9 which is used for illustrating the relationship between camera grayscale value and screen brightness of a deflectometry sensor. In FIG. 9, the camera grayscale value is plotted against the screen brightness in $cd/m^2$. A completely overexposed camera image has a camera grayscale value of 255. Due to the overexposure, the linear relationship is valid only for camera grayscale values in the interval [0; 250].

The linear relationship is determined by the target grayscale value $GW_{target}$ and the target brightness $DH_{target}$:

$$GW = \frac{GW_{target}}{DH_{target}} * DH$$

where $GW_{target}$=230 and $DH_{target}$=600 cd/m² in the configuration used.

FIG. 10 shows a diagram for illustrating the relationship between image brightness and backlight setting of the screen of a deflectometry sensor, wherein the camera grayscale value is plotted against the backlight setting as a percentage. According to the diagram from FIG. 10, the backlight setting behaves linearly in the interval [0%; 95%] with respect to the screen brightness. In the case of a backlight setting of 0, the screen has a residual brightness of approximately 180 cd/m² (compare FIG. 10), resulting in a camera grayscale value $GW_0$ of approximately 70, compare FIG. 11. FIG. 11 shows a diagram for illustrating the relationship between camera grayscale value and backlight setting of the screen of a deflectometry sensor, wherein the camera grayscale value is plotted against the backlight setting as a percentage.

In the case of a backlight setting from 95% to 100%, the screen brightness is nearly constant. This can be obtained from the diagram according to FIG. 12, which plots the relationship between screen brightness and backlight setting in the interval [80; 100] of a deflectometry sensor. In FIG. 12, the screen brightness in cd/m² is plotted against the backlight.

Thus, the backlight setting BLnew can be calculated for a target grayscale value $GW_{target}$ of the camera as a function of the current camera grayscale value GWcurrent, the zero grayscale value $GW_0$ and as a function of the current backlight setting $BL_{current}$:

$$BL_{new} = \frac{GW_{target} - GW_0}{GW_{current} - GW_0} * BL_{current}$$

with $GW_{target}$=230 in the configuration used.

The screen controller has an RS232 interface by means of which the screen settings such as, for example, the backlight can be requested and set. The sensor can be connected to the sensor PC on the robot by an optical fiber connection.

Thus, by means of the application software, it is then possible to set the backlight of the screen and thus correct the brightness decrease of the screen during ongoing operation in an automated and regular manner. Since this can occur in the context of the daily function check or sensor check, no additional expenditure of time is necessary. In addition, in an automated manner, a request for replacement of the old screen can be issued as soon as the screen has aged enough so that the maximum backlight setting is no longer sufficient to compensate for the brightness decrease. Thus, a constant measurement value can be achieved in an automated manner during production.

With regard to additional advantageous designs of the reference plate according to the disclosure and of the method according to the disclosure, reference is made to the general part of the description and to the appended claims in order to avoid repetitions.

Finally, it is explicitly pointed out that the above-described embodiment examples of the reference plate according to the disclosure and of the method according to the disclosure are used only for the purpose of explaining the claimed teaching, without, however, limiting it to the embodiment examples.

LIST OF REFERENCE NUMERALS

1 Deflectometry sensor
2 Screen
3 Camera
4 Measurement object
5 Reference plate
6 Coded mark
7 Siemens star
8 Marking group
9 Marking group
10 Marking group
11 Marking group
12 Siemens star
8' Camera image
9' Camera image
10' Camera image
11' Camera image

The invention claimed is:

1. A reference plate configured to provide a calibration and/or check of a deflectometry sensor system, the deflectometry sensor system comprising an image generation device and a capturing device including a plurality of cameras to provide an enlarged field of view, the reference plate corresponding to a size of the field of view and comprising:
   a reflective surface having a predefined pattern that includes markings in order to check at least one system parameter of the deflectometry sensor system,
   wherein the predefined pattern that includes markings is configured to provide information that calibrates and/or checks the deflectometry sensor system and includes a plurality of marking groups, such that for each camera of the capturing device, a marking group is provided for recording an image of the respective marking group.

2. The reference plate according to claim 1, wherein the markings of the predefined pattern are arranged, at least in a top view, in a form of a regular grid on the reflective surface.

3. The reference plate according to claim 1, wherein the markings are in a non-planar arrangement on the reflective surface.

4. The reference plate according to claim 1, wherein the markings include predefined contour edges and/or a predefined test chart.

5. The reference plate according to claim 1, wherein the markings include coded marks.

6. The reference plate according to claim 1, wherein the markings include Siemens stars.

7. The reference plate according to claim 6, wherein the Siemens stars are arranged in the predefined pattern or in the marking groups such that in a central area of an image recorded by a camera of the capturing device, a Siemens star is present.

8. The reference plate according to claim 6, wherein the Siemens stars are arranged in the predefined pattern or in the marking groups such that in each corner area of an image recorded by a camera of the capturing device, a Siemens star is present.

9. A method of calibrating and/or checking a deflectometry sensor system, the deflectometry sensor system including an image generation device and a capturing device including a plurality of cameras for producing an enlarged field of view, the method comprising the steps of:
proviiding a reference plate having a reflective surface including a predefined pattern that includes markings, the reference plate corresponding to a size of the field of view, wherein the predefined pattern includes a plurality of marking groups such that, for each camera of the capturing device, a marking group is provided for recording an image of the marking group;
recording, by the cameras, images of the reference plate; and
determining at least one system parameter of the deflectometry sensor system based on the recorded images.

10. The method according to claim 9, wherein the predefined pattern and/or a predefined pattern sequence is generated on the image generation device, overall brightness.

11. The method according to claim 9, wherein the reference plate is configured such that image points included by the image generation device are reproduced via the reference plate on the capturing device.

12. The method according to claim 9, wherein the reference plate is positioned at a predefined distance from the capturing device.

13. The method according to claim 9, wherein the image generation device is configured to be operated with homogeneous brightness to generate a white image.

14. The method according to claim 9, wherein the image or images recorded with one or more cameras includes a marking group having markings, and the at least one system parameter of the deflectometry sensor system is determined, based on the marking group in the recorded one or more images.

15. The method according to claim 9, wherein the at least one system parameter of the deflectometry sensor system is one of the group comprising:
a sharpness parameter;
a viewing range parameter;
a brightness parameter;
a position parameter; and
a robot correction parameter.

16. The method according to claim 15, wherein determining the sharpness parameter of a camera of the capturing device further comprises:
determining a sharpness value of Siemens stars within a marking group of the predefined pattern.

17. The method according to claim 15, wherein determination of the viewing range parameter of a camera of the capturing device further comprises:
determining positions of Siemens stars within a marking group of the predetermined pattern.

18. The method according to claim 15, wherein determination of the brightness parameter of a camera of the capturing device further comprises:
performing a grayscale value determination on a settable, central image area of the image captured by the camera, wherein the image area is selected such that no markings of the predefined pattern are present in the image area.

19. The method according to claim 15, wherein determining the brightness parameter of the deflectometry sensor system further comprises:
determining a new brightness setting of the image generation device for reaching a target grayscale value of the capturing device based on a grayscale value of the capturing device recorded with a predefined brightness setting of the image generation device.

20. The method according to claim 15, wherein determination of the position parameter of a camera further comprises:
detecting positions of coded marks within a marking group of the predefined pattern.

21. The method according to claim 20, wherein determination of the robot correction parameter, including determination of a 3D transformation as the robot correction parameter further comprises:
computing, using a minimization algorithm, distances between target position and a current position of the coded marks.

* * * * *